J. V. CANNIZZARO.
MILK BOTTLE RETAINER.
APPLICATION FILED FEB. 7, 1921.

1,394,142.

Patented Oct. 18, 1921.

INVENTOR
James V. Cannizzaro
BY Jas. H. Griffin
ATTORNEY

UNITED STATES PATENT OFFICE.

JAMES V. CANNIZZARO, OF NEW YORK, N. Y.

MILK-BOTTLE RETAINER.

1,394,142.   Specification of Letters Patent.   Patented Oct. 18, 1921.

Application filed February 7, 1921. Serial No. 443,004.

*To all whom it may concern:*

Be it known that I, JAMES V. CANNIZZARO, a subject of the King of Italy, residing at New York city, borough of Manhattan, in the county and State of New York, have invented a certain new and useful Milk-Bottle Retainer, of which the following is a specification.

This invention is a milk bottle retainer adapted to be fixed in position in any convenient location to receive the neck of a milk bottle when brought into coöperation therewith by the milkman and to automatically lock the milk bottle in position until it is released through the employment of a key in the possession of the housekeeper.

It has been heretofore proposed to provide milk bottle holders in the form of a box or casing into which a milk bottle is adapted to be deposited, and bottle retainers have also been suggested which grip the neck of the bottle. However, in the first instance, the box had to be made quite large and unsightly, and in the second instance, the boxes were invariably made with an open side, and the box had to be placed adjacent a window or door which normally served to close the open side and had to be open in order to remove the milk bottle from the box.

The object of the present invention is to provide a milk bottle retainer which will grip the neck of the bottle, when such neck is projected through an opening in the box and will serve to tightly maintain the bottle in position until the gripping means is released by a key. The box of the present invention may be positioned in any convenient place and is not dependent upon its operation for coöperation with a window or door. It may be secured to a solid wall and at a point distant from a door or window.

Features of the invention, other than those specified, will be apparent from the hereinafter detailed description and claims, when read in conjunction with the accompanying drawings.

The accompanying drawings illustrate one practical embodiment of the present invention, but the construction therein shown is to be understood as illustrative, only, and not as defining the limits of the invention.

Figure 1:
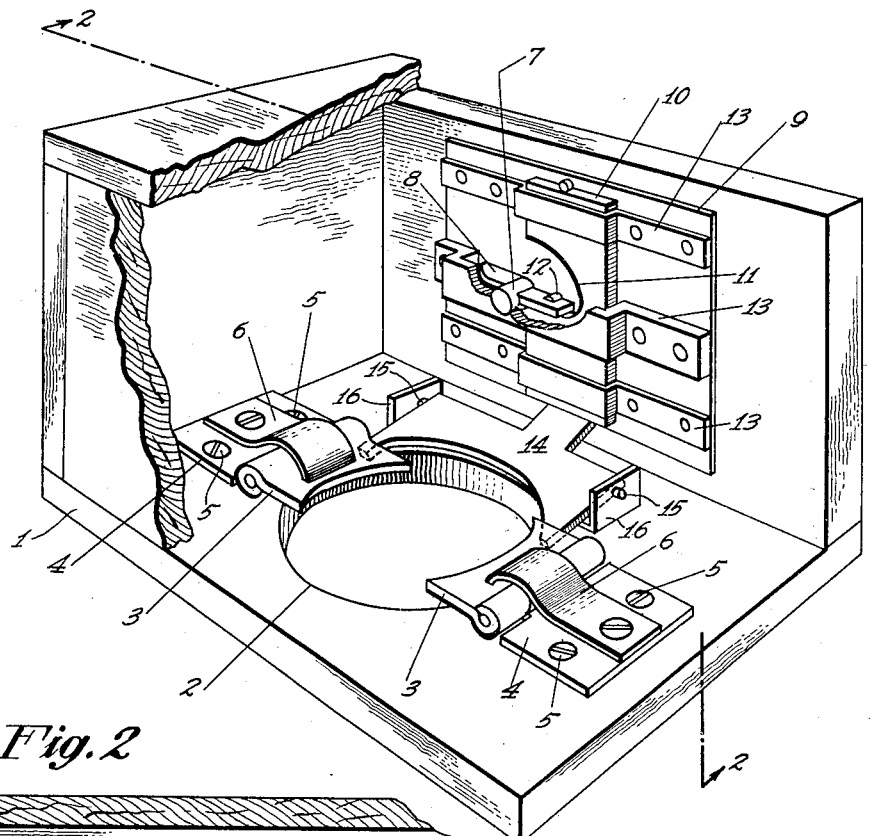
Figure 2:
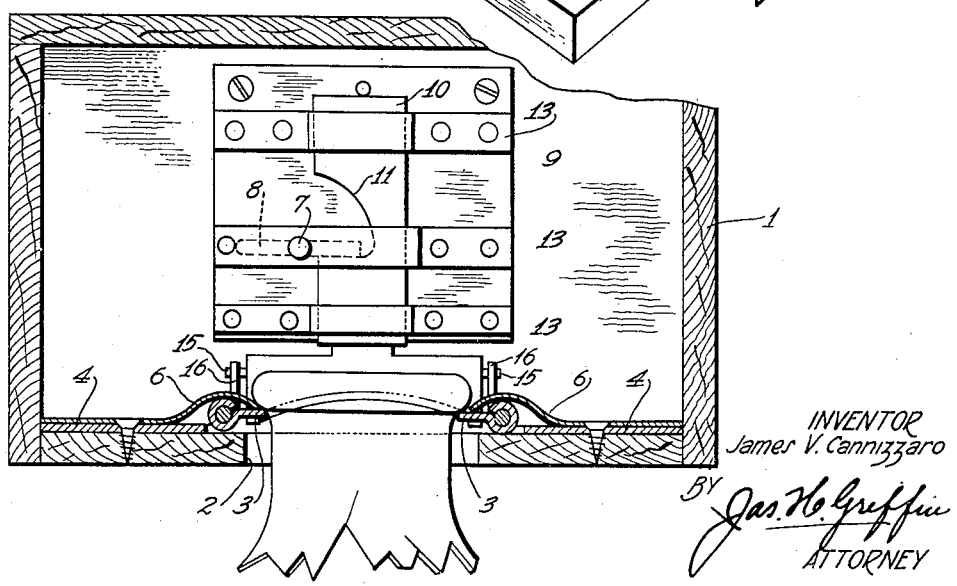

Figure 1 is a perspective view of a milk bottle retainer embodying the present invention, parts of the walls forming the same being broken away to more clearly show the interior of the box; and, Fig. 2 is a section on the line 2—2 of Fig. 1.

Referring to the drawings, 1 designates a box or casing which may be of any desired shape or configuration and may be formed of wood or metal as desired. The invention enables this box to be made quite small, whereby it may be readily mounted by screws or brackets on any fixed support in a simple and convenient manner.

The bottom of the box is provided with a hole 2 of a size to permit the neck of the milk bottle to be projected upwardly through the hole and into the box whereby it may be brought into engagement with the retaining means for precluding its withdrawal by unauthorized persons.

To this end, the box is provided interiorly with a pair of hinged retaining flaps 3. These flaps are hinged to plates 4, which are secured to the bottom of the box by screws 5. The free edge of each flap is curved as shown and leaf springs 6 coöperate with the flaps to normally hold them flat against the bottom of the box in a position to project toward one another and overlie the margins of the hole 2 in the bottom.

It will be apparent that with this construction, the flaps 3 will yield when the neck of a milk bottle is thrust through the hole until the enlarged bead at the mouth of the bottle has passed, whereupon the springs 6 will cause the flaps to swing back and preclude the withdrawal of the bottle. Thus the milkman positions the bottle in coöperative relation with the box and leaves it in this position, wherein it is locked against surreptitious removal, until withdrawn by an authorized person.

The withdrawal of the bottle from the box by the housekeeper is accomplished through the use of a key 7, which is adapted to be passed through a key hole 8 and into coöperative relation with lock mechanism 9. This lock mechanism embodies a bolt 10, having a cut out portion 11, in which the key operates, so that as the key is rotated in one direction, the bolt 10 is depressed, while when operated in the other direction, the bolt 10 is raised. One or more wards 12 may be associated with the lock if desired.

The bolt is guided for sliding movement in off set portions of straps 13 and bears at its lower end against one end of a lever or rocking plate 14. The lever or rocking plate 14 is provided with trunnions 15 intermediate its ends and these trunnions pass through perforations in brackets 16, whereby the plate 14 may be tilted on these trunnions. The free end of the plate 14 is curved on the arc of the circle so that this curved end may embrace the end of a milk bottle and extend below the flaps 3.

It will appear that by this construction, the rotation of the key in one direction will cause the bolt to depress the end of the rocking plate 14 with which it coöperates, which will effect a raising of the other end of said plate and an upward tilting of the retaining flaps 3, for the purpose of swinging said flaps back sufficiently far to permit of the removal of the milk bottle. Rotation of the key in the other direction will cause the key to engage with the upper portion of the cut-out part 11 and to return to normal position with the consequent return of the flaps 3 to the normal depressed position.

In practice, the springs 6 may serve to return the parts to their normal position without requiring manual rotation of the key.

In the manner described the milkman leaves the milk bottle locked by its neck in the hole 2 to be subsequently released by the housekeeper through the employment of the key 7.

For the purpose of illustration, a box 1 with only one hole 2 is shown, whereby it is adapted to secure only one bottle in place. However, in practice, the box may be made longer with holes at spaced distances along its bottom so that more than one bottle may be retained by the same box.

The box is made tight at the joints and without any doors or other closures which require opening for any reason whatsoever.

When the milk bottle is in place, it closes the opening in the bottom of the box and in this way entirely protects the top of the bottle from dust and dirt.

Having thus fully described the invention, what I claim as new and desire to secure by Letters Patent is;

1. A milk bottle retainer embodying a casing provided in its bottom with an aperture through which the neck of a milk bottle is adapted to be passed, a plurality of pivoted flaps, positioned interiorly of the casing, and extending radially over the margin of the opening, for the purpose of gripping the neck of a milk bottle and precluding its surreptitious removal, a pivoted plate, one end of which extends beneath the pivoted flaps and a key operated bolt coöperating with the other end of the plate and adapted to operate upon the plate to tilt the flaps in a position to release the bottle.

2. A milk bottle retainer embodying a box provided at its bottom with a hole, through which the neck of a milk bottle may be passed, a pair of hinged flaps positioned at the opposite sides of the hole and mounted on the interior of the box, so as to project over the margin of the hole, springs for normally maintaining the flaps in depressed condition to grip the neck of a bottle passed through the hole, a key operated bolt, and a first class lever, one arm of which extends beneath the pivoted flaps and the other arm of which coöperates with the bolt, whereby the bolt is adapted, when operated upon by a key, to tilt the lever and effect a tilting of the pivoted flaps to release the bottle.

In testimony whereof, I have signed my name to this specification.

JAMES V. CANNIZZARO.